June 29, 1971    P. E. METZGER    3,588,958
AUTOMATIC SPRUE EXTRACTOR FOR USE IN INJECTION
MOLDING MACHINES
Filed Dec. 27, 1968    3 Sheets-Sheet 1
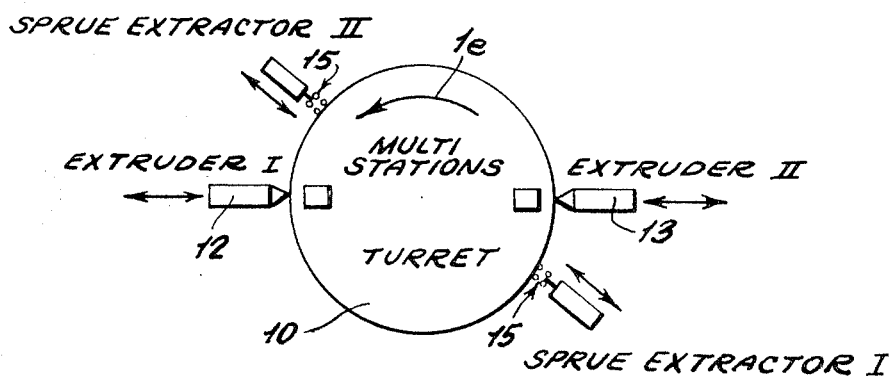
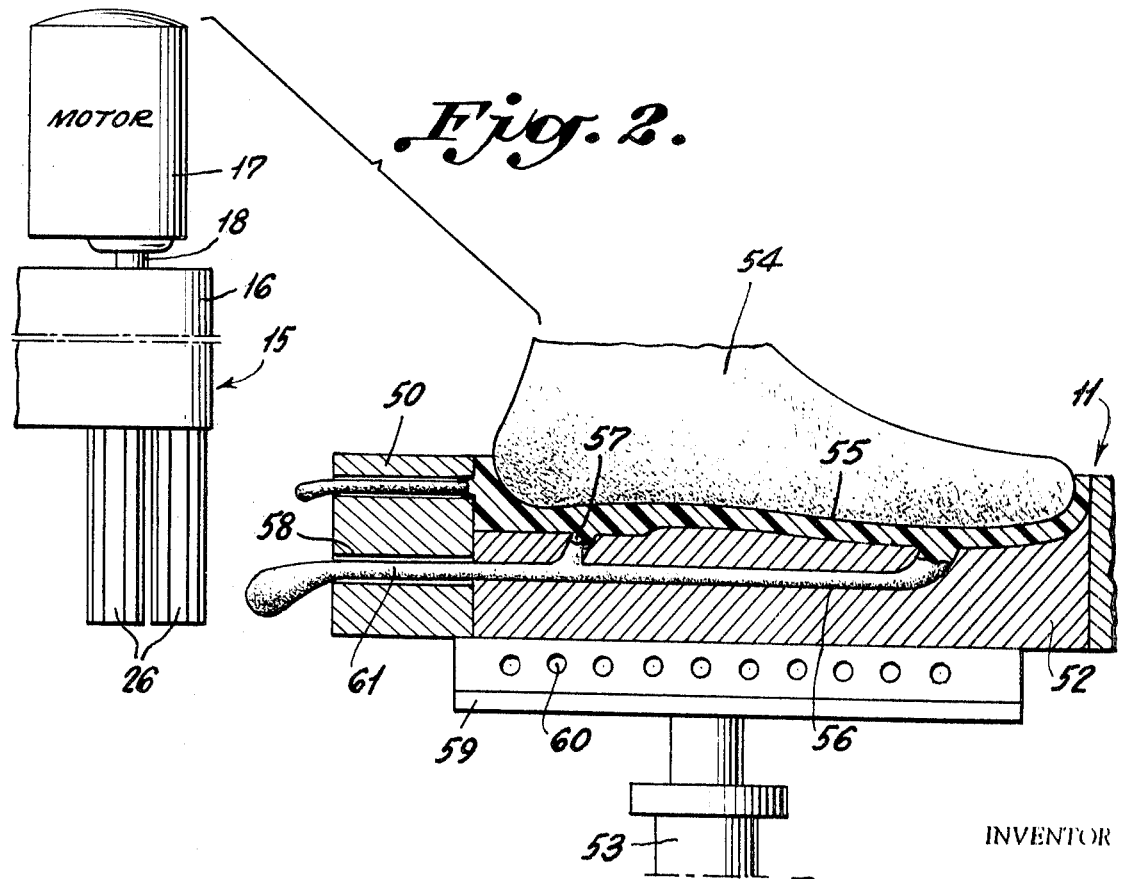
INVENTOR
PAUL E. METZGER
BY Holman, Glascock, Downing
& Seebold
ATTORNEYS

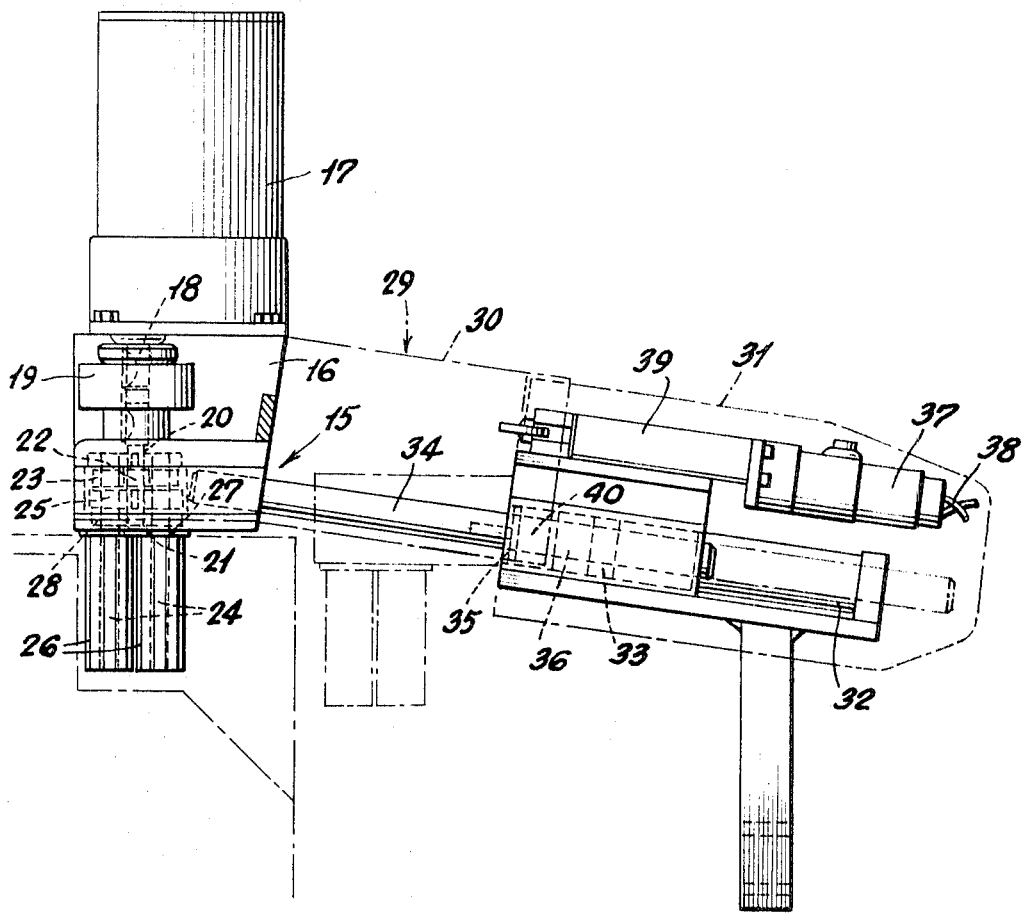

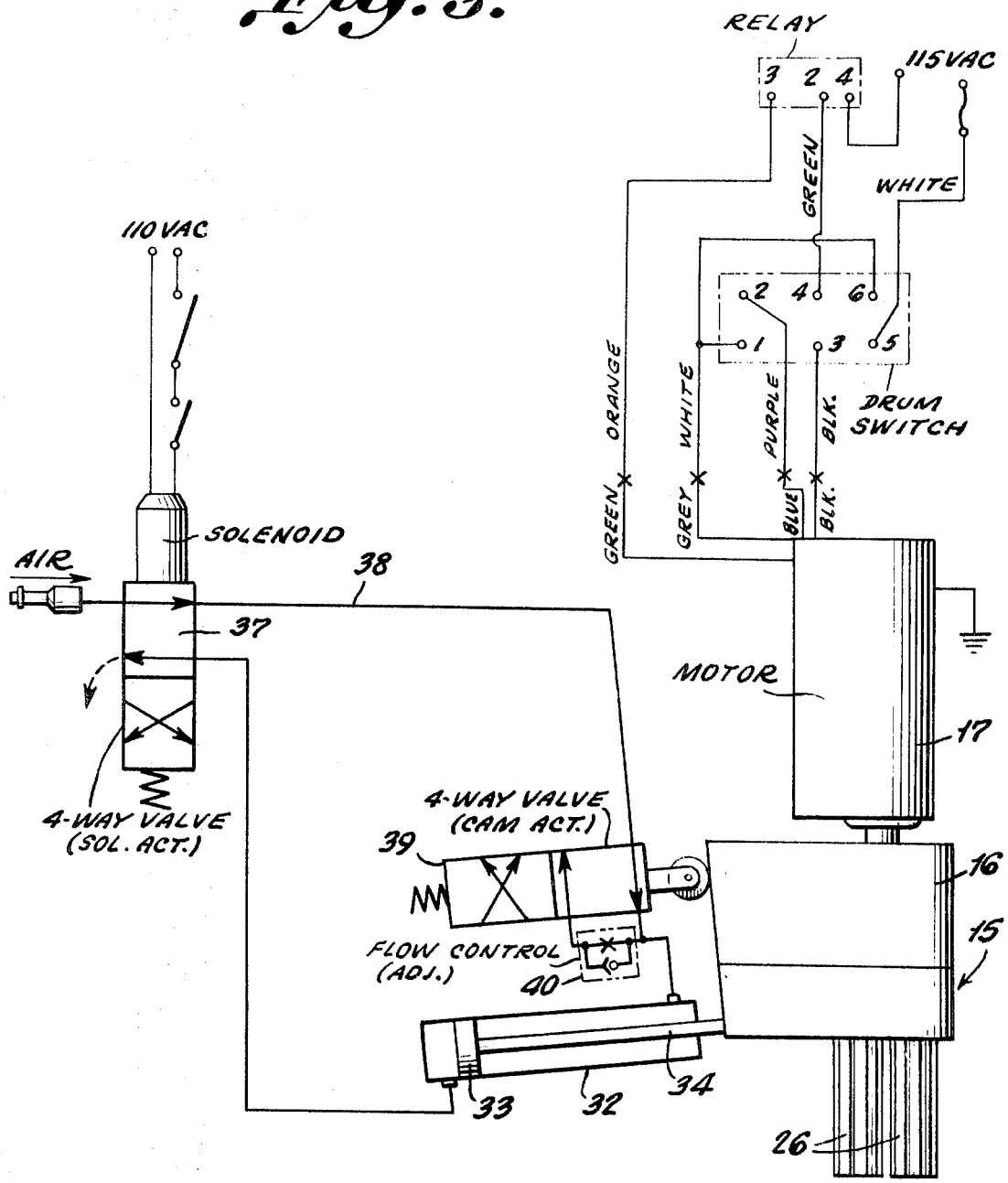

United States Patent Office 3,588,958
Patented June 29, 1971

3,588,958
AUTOMATIC SPRUE EXTRACTOR FOR USE IN INJECTION MOLDING MACHINES
Paul E. Metzger, Belcamp, Md., assignor to Bata Shoe Company, Inc., Belcamp, Md.
Filed Dec. 27, 1968, Ser. No. 787,502
Int. Cl. B29c 1/00
U.S. Cl. 18—30US    7 Claims

ABSTRACT OF THE DISCLOSURE

An automatic sprue extractor for an injection molding machine of the type having a molding assemblage and a bottom last provided with an axial channel communicating with the molding cavity by ports and having an aperture leading to the axial channel through which the desired thermoplastic material is injected with such channel, with the ports and aperture having a sprue formed therein upon setting or solidifying of the thermoplastic material, the extractor including a power operated cylinder-piston assembly so related to the injection station that upon activation of the cylinder-piston unit, the piston rod is extended to permit a gripping means associated therewith to grasp the tail of the sprue and upon such gripping action, the piston rod retracts into the cylinder thereby withdrawing the sprue and upon completion of the last mentioned movement, the gripping means releases the sprue for deposit into a suitable receptacle.

BACKGROUND OF THE INVENTION

The present invention relates to an automatic sprue extractor for use with injection molding machines and more particularly for injection molding machines of the so-called turret type.

While the invention is particularly efficacious for use in connection with two color molding injection operations, it is, of course, obvious that it is not thus restricted.

In the production of shoes on a turret type machine, at one of the work stations an operator initiates the lasting of the upper after which the last is moved to a further station where the mold is closed and the lasted upper introduced into the closed mold. Following the closing of the mold, the first thermoplastic material is injected and the mold moved to a further station where the second thermoplastic material is injected to provide the remainder of the sole. Of course, the sprues of the respective injection operations must be withdrawn and the mold opened to permit the removal of the completed shoe therefrom.

It has been customary heretofore, for an operator to manually withdraw the sprues and needless to say, this is a time consuming and expensive operation.

SUMMARY OF THE INVENTION

Accordingly, an important object of this invention is to provide automatic means for withdrawing or pulling the sprue.

Generally the invention is directed to an automatic sprue extractor for injection molding apparatus for producing footwear of the type including a rotatable support, at least one molding unit on the support, each molding unit being provided with a movable last, with the molding unit and last constituting a molding cavity, an axial channel and ports leading to the molding cavity, an injector unit for injecting thermoplastic material into the channel, ports and molding cavity when the rotatable support moves the molding unit into operative relationship with respect to the injector unit, means for cooling the molding unit whereby solidification of the thermoplastic material forms a sprue in the ports and channel, and an extractor for withdrawing the sprue, the extractor comprising a gripper located in advance of the injector unit with respect to the direction of rotation of the table, means for displacing the gripper towards the molding unit to grip the sprue and retract the gripper and sprue from the molding unit, and means operably associated with the displacing and retracting means and rotatable support for actuating the latter means when the rotatable support reaches the withdrawing means.

Further important objects and advantages of the invention will become more readily apparent from the following detailed specification and annexed drawings and in which drawings:

BRIEF DESCRIPTION OF THE DRAWINGS

FIG. 1 is a diagrammatic plan view of a turret machine illustrating the use of the invention, FIG. 2 is a view partly in section and partly in elevation of a mold having a last positioned therein and illustrating diagrammatically the relationship of the fluid-operated sprue extractor to the mold, FIG. 3 is a diagram of the circuitry for the automatic sprue extractor, and FIG. 4 is an elevational view of the extractor.

DETAILED DESCRIPTION OF THE INVENTION

For illustrative purposes only, the turret type machine indicated generally at 10 is a "Desma" model 704C and the details and operation thereof are well known to persons skilled in the shoe industry. The turntable of the machine is provided with multiple lasts and mold units which are movable in a particular timed relationship throughout the operating cycle of the machine and one of such mold units is illustrated in FIG. 2 and is denoted generally 11. Referring again to FIG. 1, it will be noted that the first thermoplastic material is injected into the mold 11 by a suitable injector 12. The second material is injected by a similar type injector 13 and the injectors 12 and 13 are located substantially diametrically opposite each other. Since, the injectors form no part of the present invention it is unnecessary to describe such units in detail.

The material to be injected may be any suitable plastisol composition, polyvinyl chloride mixtures, thermoplastic rubber or other materials presently used in the shoe industry for forming soles.

As indicated by the arrow 1e, the turret machine rotates in a counter-clockwise direction and immediately in advance of each of the injectors 12 and 13 viewed in the direction of rotation of the machine is located the automatic sprue extractor of the present invention and each unit is generally indicated 15. The extractor 15 comprises a main housing 16 to which a second housing 17 containing an electric motor is housed and the motor is a gear type motor preferably capable of developing 45 r.p.m. The motor is provided with a drive shaft 18 which extends into the housing 16 and is equipped with a slip clutch 19 suitably operably related thereto. The shaft 18 is further provided with upper and lower bearings 20 and 21 respectively. A spur gear 22 is carried by the drive shaft and is operably related to spur gears 23 constituting an intermediate drive. Two pairs of driven shafts 24 extend below the housing 16 and are provided with spur gears 25 constituting a final drive. A serrated roller 26 is rotatable with each driven shaft 24 and the gear train is such that the rollers of each pair rotate in opposite directions. A sealing means 27 is provided for the bottom of the housing and the driven shafts 24 are equipped with bearing means 28.

A casing 29 extends from the housing 16 and includes a cover portion 30 extending therefrom at an angle and a body portion 31. Positioned within the body portion 31 is an air cylinder 32 in which is mounted for extension and retraction a piston 33 and a piston rod 34 with the piston rod being operably affixed to the housing 16. The piston rod is equipped with a ball bearing 35 and a ball bushing 36 constituting a seal.

Also located within the body portion 31 is a four-way valve 37 which is solenoid actuated for controlling a supply of air through conduit 38 and the valve is spring retracted. A further four-way valve 39 is provided for the air conduit and this valve is cam actuated and spring retracted and an adjustable flow control 40 is located intermediate the valve 39 and the cylinder 32. The circuitry is believed fully and clearly illustrated in FIG. 3.

The extractor assemblage is suitably mounted with respect to the machine 10 and the arrangement is such that the sprue will be withdrawn from the mold at an angle of preferably 15 degrees although the range of angularity can be within 15–25 degrees.

Each mold 11 is a split type mold having two side molds 50 mounted on side mold carriers (not shown) capable of reciprocable movement transversely respecting the longitudinal axis of the mold 11. The side molds 50 are removably mounted on the carriers 51 to permit molds of different sizes to be used dependent upon the particular size of the last.

A sole and a heel plate 52 operably connected to a hydraulic or pneumatic cylinder-piston assembly 53 cooperates with the side molds in the closed position and a lasted upper 54 to provide a molding cavity 55. The sole plate 52 is formed with an axial channel 56 and ports 57 leading to the cavity 55. The side molds 50 are provided with an aperture 58 which leads to the channel 56 at one end and is adapted to be placed in registry with the nozzle of an injector at the other end.

A cooling plate 59 having ducts 60 for a suitable coolant is provided for cooling the sole plate in a manner well known in the art.

It should be mentioned that when the extruder 13 moves in the direction of the machine 10, the sprue extractor 15 in advance thereof moves forward therewith. The same is true of the sprue extractor in advance of the extruder 12. This operation is perhaps best illustrated in FIG. 3 and when the extractor has reached its ultimate destination, the rotating serrated rollers grasp and feed the tail 61 rearwardly, after which the injector and extractor are moved in the reverse direction thereby withdrawing the tail.

This invention is not to be confined to any strict conformity to the showings in the drawings but changes or modifications may be made therein so long as such changes or modifications mark no material departure from the spirit and scope of the appended claims.

What I claim is:

1. An automatic sprue extractor for use in an injection molding apparatus for footwear of the type having an upper and an outsole, a rotatable support, at least one molding unit having a movable last associated therewith, with the unit and the bottom of the last defining a molding cavity, said unit having an axially extending channel and ports leading to the molding cavity, an injector unit for injecting thermoplastic material into said channel, ports and molding cavity when the rotatable support moves the molding unit into operative relation to the injector unit, and means for cooling the unit whereby solidification of thermoplastic material forms a sprue in said ports and channels, the extractor including at least one pair of power driven serrated rollers rotatable in opposite directions, said rollers being located in advance of the injector unit with respect to the direction of rotation of the table, means to displace the pair of rollers toward the mold unit to grip the sprue and retract the pairs of rollers and sprue from the mold unit, and means operably related to the displacing and retracting means and rotatable support operative to actuate the displacing and retracting means when the support reaches the extractor.

2. The injection molding appartus as claimed in claim 1 in which said extractor is located at an angle of about 15 degrees relative to the axial channel in said sole plate.

3. The injection molding apparatus as claimed in claim 2, in which said displacing and retracting means includes a fluid cylinder, a piston and a piston rod with said one pair of power driven rollers being carried by the free end of said piston rod.

4. The injection molding apparatus as claimed in claim 3 in which said actuating means includes a cam mounted on the rotatable support.

5. The molding apparatus as claimed in claim 1 in which a second pair of serrated rollers rotatable in opposite directions is mounted rearward of the first pair.

6. The molding apparatus as claimed in claim 5 in which gear means operably related to said pairs of rollers drives said rollers in unison.

7. An automatic screw extractor for use in an injection molding apparatus for footwear of the type having an upper and an outsole, a rotatable support, at least one molding unit having a movable last associated therewith, with the unit and the bottom of the last defining a molding cavity, said unit having an axially extending channel and ports leading to the molding cavity, an injector unit for injecting thermoplastic material into said channel, ports and molding cavity when the rotatable support moves the molding unit into operative relation to the injector unit, and means for cooling the unit whereby solidification of thermoplastic material forms a sprue in said ports and channels, the extractor including at least one pair of power driven rollers rotatable in opposite directions, said rollers being located in advance of the injector unit with respect to the direction of rotation of the rotatable support, means to displace the rollers toward the mold unit to grip the sprue and retract the rollers and sprue from the mold unit, and means operably related to displacing and retracting means and rotatable support operative to actuate the displacing and retracting means when the support reaches the extractor.

References Cited
UNITED STATES PATENTS

| | | | |
|---|---|---|---|
| 3,371,385 | 3/1968 | Cordio | 18—SRDIG. |
| 3,407,443 | 10/1968 | Beebee | 18—30PR |
| 2,890,483 | 6/1959 | Soubier | 18—5BS |

FOREIGN PATENTS

| | | | |
|---|---|---|---|
| 1,008,242 | 10/1965 | Great Britain | 18—30PR |
| 948,901 | 2/1964 | Great Britain | 18—30US |

CHARLES W. LANHAM, Primary Examiner

M. J. KEENAN, Assistant Examiner

U.S. Cl. X.R.

18—42H, 5BP; Dig. 51